United States Patent
Scheibl et al.

(10) Patent No.: US 10,247,493 B2
(45) Date of Patent: Apr. 2, 2019

(54) DEVICE FOR CONTROLLED HEAT TRANSFER TO AND FROM A COMPONENT

(71) Applicant: FORSCHUNGSZENTRUM JUELICH GMBH, Juelich (DE)

(72) Inventors: Lothar Scheibl, Aachen (DE); Joachim Schruff, Aachen (DE)

(73) Assignee: Forschungszentrum Juelich GmbH, Juelich (DE)

( * ) Notice: Subject to any disclaimer, the term of this patent is extended or adjusted under 35 U.S.C. 154(b) by 49 days.

(21) Appl. No.: 15/509,745

(22) PCT Filed: Sep. 11, 2015

(86) PCT No.: PCT/DE2015/000453
§ 371 (c)(1),
(2) Date: Mar. 8, 2017

(87) PCT Pub. No.: WO2016/050230
PCT Pub. Date: Apr. 7, 2016

(65) Prior Publication Data
US 2017/0292796 A1    Oct. 12, 2017

(30) Foreign Application Priority Data
Sep. 29, 2014   (DE) .................. 10 2014 014 070

(51) Int. Cl.
*G21B 1/13*    (2006.01)
*B01J 19/00*    (2006.01)
(Continued)

(52) U.S. Cl.
CPC ............ *F28F 13/08* (2013.01); *B01J 19/0013* (2013.01); *F28F 13/00* (2013.01); *G21B 1/13* (2013.01);
(Continued)

(58) Field of Classification Search
CPC ...... F28F 13/08; F28F 13/00; F28F 2013/006; B01J 19/0013; G21B 1/13; H05K 999/99; Y02E 30/128
(Continued)

(56) References Cited

U.S. PATENT DOCUMENTS 3,951,327 A    4/1976   Snow et al.
4,696,781 A    9/1987   Bourque
(Continued)

FOREIGN PATENT DOCUMENTS

DE    2603152 A1    7/1976
DE    24195 T1    8/1983
(Continued)

*Primary Examiner* — Justin M Jonaitis
(74) *Attorney, Agent, or Firm* — Norris McLaughlin, P.A.

(57) ABSTRACT

A component coupling system for controllable heat transfer from or to a component which is heated by an external and/or internal heat source and is disposed adjacent to a cooler. The component coupling system includes a carrier plate, on which least one first means for spacing is disposed such that a component disposed on the means for spacing and the carrier plate, together with the means for spacing, form a first cavity. If needed, this cavity can be evacuated, filled with a fluid medium, or have a fluid medium flow through it, whereby the heat transfer or the heat dissipation from the component can be controlled in a simple manner.

14 Claims, 3 Drawing Sheets

(51) Int. Cl.
*F28F 13/00* (2006.01)
*F28F 13/08* (2006.01)

(52) U.S. Cl.
CPC ....... *F28F 2013/006* (2013.01); *Y02E 30/128* (2013.01)

(58) Field of Classification Search
USPC ..................... 165/171, 80.1, 80.2, 80.4, 80.5
See application file for complete search history.

(56) References Cited

U.S. PATENT DOCUMENTS

| | | | |
|---|---|---|---|
| 4,842,683 A * | 6/1989 | Cheng | H01J 37/32431 156/345.37 |
| 5,094,885 A * | 3/1992 | Selbrede | C23C 16/04 118/715 |
| 5,193,612 A | 3/1993 | Stirnkorb | |
| 5,509,472 A | 4/1996 | Tamura et al. | |
| 5,578,532 A * | 11/1996 | van de Ven | C23C 16/04 118/728 |
| 6,138,745 A * | 10/2000 | Moslehi | C23C 14/50 118/728 |
| 2002/0086179 A1 | 4/2002 | Wittebrood | |
| 2007/0246839 A1* | 10/2007 | Herchen | H01L 21/67011 257/784 |
| 2007/0256786 A1* | 11/2007 | Zhou | H01J 37/32477 156/345.34 |
| 2007/0283884 A1* | 12/2007 | Tiller | C23C 14/564 118/715 |
| 2011/0165033 A1 | 7/2011 | Meschke et al. | |

FOREIGN PATENT DOCUMENTS

| | | |
|---|---|---|
| DE | 4037969 A1 | 6/1992 |
| DE | 102008048014 A1 | 4/2010 |
| DE | 102009010257 A1 | 8/2010 |
| DE | 102010011020 A1 | 9/2011 |
| DE | 102011115784 A1 | 4/2013 |
| EP | 0542534 A1 | 5/1993 |
| EP | 0571863 A1 | 12/1993 |
| GB | 894462 A | 4/1962 |

* cited by examiner

DEVICE FOR CONTROLLED HEAT TRANSFER TO AND FROM A COMPONENT

BACKGROUND OF THE INVENTION

The invention relates in general to a device for temperature control, which can be used to heat components coupled thereto to temperatures of up to 1500° C., to maintain these at this temperature or to cool these back to room temperature, and in particular to a device in which the heat transfer to and from a component can be designed to be variable.

In the course of the exploration of materials that must satisfy high thermal requirements during use, the need arises to test these objects under adequate conditions in advance. This results a need for a device that is able to maintain an object or a sample at a constant temperature between room temperature and approximately 1500° C.

In the course of research conducted on the plasma-wall interaction (PWI) in fusion reactors, for example, different materials are examined with regard to the behavior thereof when exposed to plasma. These primarily involve hydrogen or deuterium plasma, which is generally conducted frontally at the material sample and thus results in hydrogen inventory in the material, among other things. The quantity thereof is established using various analytical methods by releasing the inventory. For this purpose, the sample ideally has a freely selectable but constant temperature, with or without plasma exposure or during the analysis. By applying an electrical field between the sample and the plasma source (biasing), it is possible to vary the ion velocity of the plasma, and thus the impact energy and penetration depth. The desired maximum sample temperature is derived from the anticipated wall temperatures of a fusion reactor.

In particular, this results in a need for a device that is able to heat a material, or a sample of the material, to a temperature above 1500° and maintain this temperature, optionally also under vacuum.

In general, the problem of heat transfer arises in the case of components that are mounted on top of, and make planar contact with, one another, since in general continuous planar contact cannot be assumed with a direct fixed component coupling system. Rather, different, unavoidable small elevations of the surface areas are kept at a distance from one another, and a non-contact space will develop between the two surfaces. In relation to the few actual contact surfaces, this intermediate space has an extent that is quite significant and clearly unfavorable with respect to heat transfer.

This problem arises to an intensified degree at a coupling site if the components to be contacted, in the form of test objects, are repeatedly exchanged. Previously customary intermediate layers made of graphite film, for example, are able to reduce, but cannot prevent, the aforementioned effect.

Moreover, it has been found that adhesions frequently remain at the coupling site upon detachment of the component (object), which may possibly accumulate and superimpose and thus, in turn, disadvantageously reduce the actual contact surface with a further test object.

Under atmospheric conditions, the heat transfer is created by the direct contact (body contact) with another component or with air molecules (convection) and by radiation. This principle usually takes place in the range up to approximately 800 to 1000° C. Applications requiring higher temperatures are generally carried out under vacuum so as to avoid any influence on the material, such as oxidation, and thus structural changes, or ultimately combustion. In this case, however, convection is eliminated due to the lack of free air molecules. While the heat transport in the case of body contact is approximately linear, the power dissipation caused by radiation increases to the fourth power of the absolute temperature. Balanced configuration of the surfaces and controlled heat transfer thus becomes increasingly important.

Two scenarios, which typically occur during the test experiments, deserve a closer look, these being the heating and the cooling of an object in question.

If an object is to be heated, ideally the entire heat output of an adjacent heater should flow primarily into the object, preferably as a result of good contact. This becomes even more important, the higher the desired temperature is for the object. However, this also means that the heat flow of the heater should be as low as possible in other directions, which is to say in the direction of a mount, or in the direction of a cooler, for example.

The opposite applies when an object is to be cooled. As large a surface area of the object as possible would then be advantageous which, as a result of contact, can bring about appropriate heat withdrawal by way of coolers.

So as to maintain a predefined object temperature at a constant level independent from outside influences, an interplay between or a mixture of these two scenarios would thus have to be achieved. The coupling of the object to the heater and to the mount or the cooler consequently plays a crucial role.

Permanently good surface area contact of the object with the heater has the advantage of good heat input when there is a need to heat the object. In this case, thermal decoupling of the cooler to as great an extent as possible is advantageous. The cooler itself should not be shut off for its own protection, and should be maintained at the maximum temperature permissible for the material used. The lower this is, however, the greater, the resulting heat sink will, of course, be.

If cooling is needed, the heater is generally shut off (but nonetheless, due the composition thereof and/or due to the material thereof, may represent a less favorable heat conductor in relation to the surrounding component material). The thermal coupling to the object and the mount thereof should be at a maximum, so as to ensure the necessary withdrawal of heat from the object, despite disadvantageous (parasitic) marginal phenomena (heater, clamping).

The clamping mechanism disposed at the edge, which generates the pressing for the component coupling system having variable heat transfer, represents good body contact with the object. While, in the case of heating, this device has the disadvantage of acting as a heat sink, additional cooling is advantageously created on the side of the object located opposite the cooler.

When heating of objects, the heat loss to the surroundings must always be taken into consideration. Under atmospheric conditions, cooling by way of convection plays a crucial role, while under vacuum the heat loss is generally created by thermal or infrared radiation since, in this case, no, or only few, molecules are available for the heat transport due to the system. Heat transfer essentially only takes place by way of radiation or direct planar contact. At high temperatures, radiation emission grows to the fourth power of the absolute temperature.

Deliberate and controllable heat transfer would, therefore, be desirable to stabilize a desired temperature in a component, but protection of the components disposed directly adjacent thereto must also be taken into consideration. Maximizing the heat transfer is desirable to reduce the transmission losses in the energy input or energy withdrawal chain. On the otherhand, deliberate thermal insulation with respect to the mount or frame could also be advantageous.

SUMMARY OF THE INVENTION

It is the object of the invention to provide a device for temperature control, which allows a heat transfer for stabilizing a desired temperature in a component to be achieved in a deliberate and controllable manner. The component temperatures can be up to 1500° C. The device for temperature control should advantageously also be usable under vacuum, and should avoid the disadvantages previously known from the prior art.

It is a further object of the invention to disclose a method for transferring heat from or to a component in a deliberate and controllable manner using the aforementioned device.

The objects of the invention are achieved by a component coupling system having the features of the main claim, and by a method for transferring heat from or to a component in a deliberate and controllable manner by way of the aforementioned component coupling system according to the additional independent claim. Advantageous embodiments of the component coupling system and of the method can be found in the respective dependent claims.

The present invention discloses a device for temperature control, by way of which heat transfer from or to a component can be achieved in a deliberate and controllable manner, so that this component can be heated to temperatures of up to 1500° C., or be cooled down to room temperature again, and moreover can be reproducibly maintained at a constant temperature between room temperature and 1500° C.

For this purpose, a component is assumed which can be heated by way of an internal heater and/or an external heat supply to temperatures of up to 1500° C., and which is disposed adjacent to a cooler so that the component can also be cooled to room temperature again, after the heating process.

The component can be a material sample, for example, which is to be examined or analyzed with respect to the behavior thereof when exposed to plasma as part of an examination on plasma-wall interaction (PWI) in fusion reactors. The analysis is generally carried out at a freely selectable but constant temperature, with or without plasma exposure. For testing and analytical purposes, it is frequently necessary to exchange such material samples. In general, an appropriate holder for such material samples is thus provided, which frequently also already comprises an internal heater.

In a particular embodiment of the invention, in particular such a holder for material samples shall thus be understood as the component, which optionally can also include an internal heater.

So as to improve a defined heat transport between the component and the cooler, a component coupling system is provided according to the invention.

The component coupling system according to the invention comprises a carrier plate, by way of which a heat transfer to the component or away from the component can take place. The carrier plate generally has two planar surfaces and, if high component temperatures are desired, typically comprises a high temperature resistant material of a ceramic or metallic type. Suitable ceramics that can be used include dense silicon carbide (SiC), such as pressureless sintered silicon carbide (SSiC) or recrystallized SiC (RSiC). Suitable metals for the carrier plate are in particular molybdenum, TZM or tungsten.

Advantageously, TZM may be selected as the material, since ceramics actually generally provide thermal insulation, and would thus reduce the heat flow to the coupled cooler. TZM shall be understood to mean titanium-zirconium-carbide microalloyed molybdenum having the following composition: 0.4 to 0.55 wt. % Ti, 0.06 to 0.12 wt. % Zr, 0.01 to 0.04 wt. % C, the remainder being Mo. Moreover, tougher properties of metals compared to ceramics are advantageous in the production of the component.

The carrier plate is intended to be disposed on the cooler and, for this purpose, has an appropriate surface geometry. In the simplest case, the planar carrier plate could be disposed directly on the cooler, whereby body contact is ensured to as great an extent as possible. The ideal coupling could be achieved by brazing the two components, by way of friction welding or by way of a hot isostatic pressing (HIP) process.

At contemplated high temperatures of up to 1500° C., the carrier plate itself usually cannot be part of the cooler, since water coolers are generally made of copper because of its good heat conduction. The melting temperature of copper is 1070 to 1085° C., depending on the alloy, and is thus significantly below the typical usage temperature of the component coupling system according to the invention. For applications at considerably lower temperatures, however, a person skilled in the art can also resort to alternative materials for the carrier plate.

For the above-mentioned reasons, the previously customary direct, planar contact between the component to be heated or to be cooled and the cooler is deliberately eliminated in the present invention. Rather, the design according to the invention provides at least one defined cavity, having a height of several millimeters, between the component and the adjacent cooler or the carrier plate.

To this end, the carrier plate of the component coupling system according to the invention comprises at least one means for spacing a component in relation to the carrier plate, the means being disposed on the carrier plate. This means for spacing comprises at least one raised substantially concentric sealing element. Such a suitable sealing element could be a peripheral, closed bead or an O-ring seal, for example. Hereafter, the size of the sealing means shall be understood to mean the surface area that this encloses on the carrier plate, while the height of the sealing element defines the distance between the carrier plate and a component seated on the sealing element at the location of the sealing element.

By placing on and fixing a component to the component coupling system, and in particular to the means for spacing, according to the invention, a defined sealed cavity is generated.

Advantageously, the size of the sealing element (surface area) is designed such that as large an area of the component as possible, and in particular, a material sample disposed therein, for example, is disposed completely within this surface area.

Since the intention is to either flood the cavity with a fluid contact medium, and have this flow through the cavity, or to apply a vacuum, the cavity must be fully sealable. It is known to be advantageous for sealing if the contact surface between the component whose temperature is to be controlled and the means for spacing is as small as possible. In particular, it is advantageous if the contact surface ideally can be reduced to only a respective contact line, which is the case in particular when the means for spacing is tapered in the direction of the component.

Within the scope of the invention, in an advantageously simple embodiment, a peripheral one-sided blade having a triangular-like cross-section, which is disposed on the carrier plate, is proposed as the sealing element.

Moreover, in a likewise simple design of the invention, a concentric arrangement of the sealing element on the carrier plate may be selected.

The sealing element can essentially have differently progressing contours on the carrier plate. However, when selecting a suitable geometry that the sealing element forms on the carrier plate, the manufacturing conditions must be taken into consideration, and additionally tightness must be ensured, which can only be achieved by uniform contact pressure of the component on the at least one sealing element.

Advantageously, the carrier plate and the means for spacing are made of one material from a manufacturing point of view.

For the purpose of good sealing properties, the sealing element should preferably be made of a hard material, which is also tough, so as to ensure a clean upper edge of the element. The planar opposite side, which in general is the bottom side of the component, should rather have a softer surface so as to achieve a certain degree of nestling against the sealing element.

If repeated exchanging of the component in relation to the stationary cooler assembly is required, it may be useful to configure the exchangeable object (component) with the softer planar surface in the region of the contact surface with the means for spacing. The surface area can thus be easily exchanged when needed, in the event of damage or wear resulting from undue pressing, while the sealing element remains unchanged.

A particular embodiment of the component coupling system according to the invention thus provides an additional, optionally exchangeable, thin sealing plate, or a sealing disk, which is disposed between the component and the means for spacing, and which is in direct contact with the component or can be disposed via a further means for spacing.

Instead of a planar surface area of the component, a precisely fitting negative contour in relation to the sealing element would also be conceivable, such as a labyrinth seal. When doing so, however, the question of the cost-benefit ratio must be taken into consideration, in particular since sensitive contours on a mobile object are generally vulnerable.

In particular, the same material that the carrier plate already comprises is an obvious choice as the material for the means for spacing, and for the sealing element in particular. The material must be temperature-stable in the usage range (for example up to 1500° C.). If fluid media are to be used, the fluid media moreover must not attack the sealing material or the carrier plate.

At the above-mentioned temperatures of up to 1500° C., copper, which otherwise is customarily used for sealing purposes, cannot be used as the means for spacing according to the invention. A substitute material for the sealing element is TZM (titanium-zirconium-molybdenum), for example, while tantalum could be used for the opposite side. For production reasons, and ultimately also for sealing reasons, the sealing element and the carrier plate will, in general, advantageously be configured as one component.

To establish good heat transfer, the cavity formed according to the invention can be flooded with arbitrary media, such as liquid or gaseous substances, or these may flow therethrough. If the component is rigidly fixed to the carrier plate by way of the means for spacing, such as by way of a clamping device, it is also possible to apply a slight positive pressure to the cavity.

Alternatively, the cavity can also be evacuated for the purpose of achieving thermal insulation.

To the extent that evacuation or a vacuum is mentioned within the scope of the invention, this shall be understood to mean a pressure of more than $10^{-5}$ mbar, and in particular a pressure between $10^{-4}$ and $10^{-5}$ mbar.

In this case as well, the means for spacing should advantageously take up as large a surface area as possible, so as to likewise configure the surface area for insulation as large as possible, with respect to the component. If a material sample is disposed in the component, the insulation surface area should advantageously also be larger than the surface area of the material sample projected onto the component surface.

So as to flood the cavity with a medium, or apply a vacuum, it is provided that at least one opening or feed line for a medium and at least one opening or discharge line for a medium are provided in the carrier plate within the sealing surface. In this way, it is possible, in particular, for the selected medium to flow through the cavity.

The above-mentioned openings or lines can each advantageously be provided with a valve, so that the flow of a medium, or the evacuation for achieving a vacuum, can be controlled. The lines themselves can be connected to supply vessels comprising appropriate contact media or a vacuum pump.

Since, in general, a planar contact is provided between the carrier plate and the adjacent cooler, in one advantageous embodiment of the invention, the lines can be guided out of the carrier plate on the sides.

If the cavity were filled only once with a medium, the surroundings would be disadvantageously impaired by the egress of the medium once the holder is detached from the means for spacing. Under these circumstances, it is thus proposed to remove the fluid medium from the cavity prior to exchanging the object by way of rinsing or by applying a vacuum via a suitable evacuation option.

So as to improve the flow through or the evacuation of the cavity, a particular embodiment of the invention provides for at least one further feed line and discharge line, in addition to at least one first feed line and discharge line. These further lines can advantageously also be provided with a valve and directly abut the carrier plate or extend in the interior thereof.

For example, a feed and/or discharge line could be disposed in the center of the means for spacing, and at least one or more feed and/or discharge lines can be provided concentrically in the immediate vicinity of the means for spacing, so that a radial flow of a fluid medium can be implemented, from the center of the cavity to the edges, or vice-versa.

By appropriately providing different pressure zones in the feed and discharge, the medium used could even change from the liquid phase to the gas phase, changing the state of aggregation thereof, for the purpose of greater heat absorption.

In a particular embodiment of the invention, it is provided, instead of providing mere flow of a contact medium through the cavity at a substantially constant pressure, to set a pressure difference between the feed and discharge lines in such a way that an initially supplied liquid medium is able to at least partially or locally change the state of aggregation thereof, while flowing through the cavity, as a result of the absorption of heat. Due to a change from a liquid phase to a gas phase, the contact medium could preferably take up a larger amount of heat. In this case, an appropriate pressure device or monitoring and control unit is provided in the feed and discharge lines.

By feeding a suitable liquid contact medium into or through the cavity according to the invention, a considerably better and more homogeneous heat transfer from and to the component can be ensured. Helium, argon or water can be mentioned, for example, as suitable liquid contact media, which are present in the form of gases and/or liquids at the operating temperature. In general, it should be noted that it must be possible to flush the media used here without residue, since otherwise the vacuum would be contaminated during the mechanical opening of the coupling system. Under these circumstances, the use of oils, for example, will be difficult to handle. Moreover, the fluid contact medium itself should not be corrosive with respect to the materials of the involved components.

Since, in general, only low pressures and small surface areas are present on the component coupling system introduced here, and no external forces are present, mechanical deformation of the component as a result of the set negative or positive pressures is not to be expected. Rather, the cavity created according to the invention advantageously results in a geometric buffer volume, which advantageously can absorb a thermally induced deformation of the component.

For example, stresses that could cause bulging could possibly be created in the center of the component in the case of a heater disposed centrally in the component, and a mount disposed on the outer edge of the component, which is necessarily cooler. The traditional body contact with an adjacent surface area would thus possibly cause lifting across a large surface area involving undefined conditions, while in the case of the present invention, advantageously, only a negligible reduction in the cavity would take place.

So as to address potential leaks in the means for spacing, it is provided, in a further advantageous embodiment of the invention, that a further means for spacing is provided on the carrier plate, the means being disposed around the first means for spacing. Together with the carrier plate and a component fixed on both sealing elements, a further cavity is thus created between the first and second means for spacing.

Moreover, at least one further discharge or feed line is provided in the carrier plate, which is disposed between the two means for spacing and optionally can discharge fluid contact medium crossing over from the first cavity.

Regardless of the function of serving as a safety zone for the first cavity, the further cavity can, of course, also be flooded with a contact medium, or have the same flow through, independently of the first cavity, or a vacuum can be applied, provided that at least one feed and discharge line or opening is provided for this purpose.

In summary, the invention can be described as disclosing a component coupling system having variable heat transfer. The application is advantageous when a freely selectable, and consequently constant, temperature of a clamped or mounted component is required, optionally including an embedded material sample, regardless of the overall composition and the thermal energy input into the component. A further advantage of the present invention is that, if one of the components (objects) to be contacted is to be repeatedly replaced, reproducible properties are produced at the contact surface.

As a result of the special arrangement, advantageously not only components having a planar surface, as in the past, but advantageously also those having a more complex 3D surface can be used, as long as a sealed cavity can be generated by the component and the means for spacing between the component and the carrier plate.

According to the invention, planar component contact is deliberately suppressed by creating, through the design, a sealed cavity between the components to be coupled, which is to say the component on the one hand and a cooler (assembly) on the other.

The approximately non-contact coupling of the component creates the option of deliberately controlling the heat transfer by selecting appropriate contact media filling the cavity.

For the purpose of thermal insulation, this space can be evacuated in a particular embodiment. In this case, only radiation is available for thermal coupling.

For good heat transfer, in a further particular embodiment, the intermediate space can be flooded with a liquid or gaseous contact medium, or have the same flow through, resulting in component contact across approximately the entire surface area.

Should high cooling power be necessary, advantageously, it would also be possible to implement heat withdrawal by way of evaporation (change in the state of aggregation) of a liquid contact medium flowing through.

A tabular overview of the different procedures using a component coupling system according to the invention can be found in the specific description section.

DESCRIPTION OF THE DRAWINGS

The subject matter of the invention is described in more detail hereafter based on exemplary embodiments and figures. In the drawings:

In FIGS. 1 to 3, the following meanings apply:
1 carrier plate as part of the component coupling system according to the invention
2$a$ first sealing element as part of the component coupling system according to the invention
2$b$ optional further sealing element
3 component to be heated or cooled, optionally comprising internal heater
4$a$ defined cavity
4$b$ optional further defined cavity
5$a$ first feed line and/or evacuation option for a contact medium
5$b$ further feed line and/or evacuation option for a contact medium
6$a$ valve for a first feed or discharge line
6$b$ valve for a further feed or discharge line
7 cooler

DETAILED DESCRIPTION OF THE INVENTION

Figure 1:
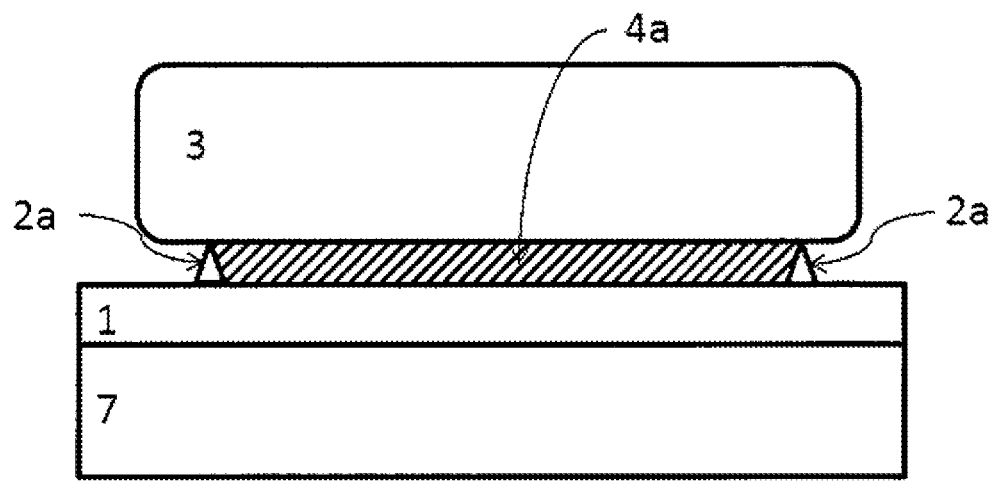
FIG. 1 shows a schematic sectional drawing of a first embodiment of the component coupling system according to the invention in contact with a component and a cooler.

FIG. 1 schematically shows an arrangement using a component coupling system according to the invention, and in particular the coupling site at which the component to be heated is in contact with the component coupling system. A cavity 4a is generated by a raised concentric sealing element 2a, which is disposed on the carrier plate 1, between the component 3 and the coupling site. in the form of a carrier plate 1 and a means for spacing 2a. The carrier plate 1 is in direct planar contact with a cooler 7.

By way of a clamping device, which is not shown here, the component 3 can be pressed against the sealing element 2a having a corresponding suitable surface, whereby a defined sealed intermediate space, this being the cavity 4a, is obtained. Here, the sealing element 2a is designed as a one-sided blade having a triangular-like cross-section. Alternatively, another geometry is also conceivable, such as a labyrinth seal.

Figure 2:
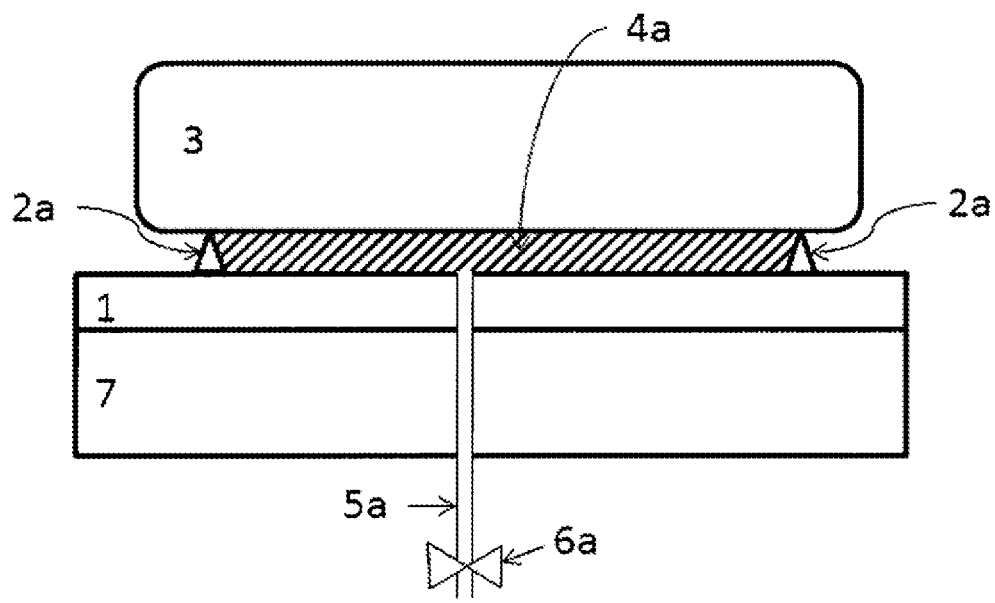
FIG. 2 shows a schematic sectional drawing of a further embodiment of the component coupling system according to the invention, comprising a feed line for a fluid medium.

If the cavity were simply filled via the feed line 5a, this would influence the surroundings due to the egress of the medium once the connection is detached. Under these circumstances, in accordance with FIG. 2, an adapted evacuation option 5a should be provided for the cavity 4a within the carrier plate 1, which is advantageously designed to be controllable via a valve 6a.

Provided that at least one feed line and one discharge line are present, it is advantageously also possible for the selected contact medium to flow through the intermediate space.

By appropriately providing different pressure zones in the feed and discharge, in a particularly advantageous embodiment of the invention, the contact medium used could even change from the liquid phase to the gas phase, changing the state of aggregation thereof, for the purpose of greater heat absorption.

Figure 3:
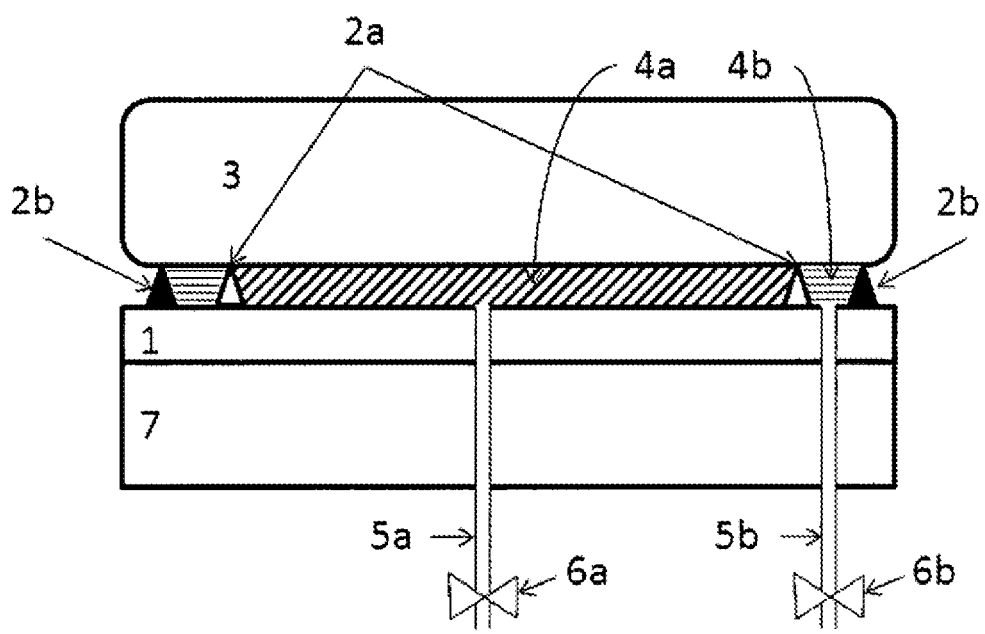
FIG. 3 shows a schematic sectional drawing of a third embodiment of the component coupling system according to the invention, comprising a further means for spacing and a further feed or discharge line for a liquid medium.

So as to address potential leaks of the first seal 2a, a further sealing element 2b, which encloses the first sealing element 2a, is advantageously provided in a further embodiment of the invention, see FIG. 3, and a further feed or discharge line 5b comprising further evacuation connections within the carrier plate 1 is provided between the two sealing elements 2a, 2b.

Figure 4:
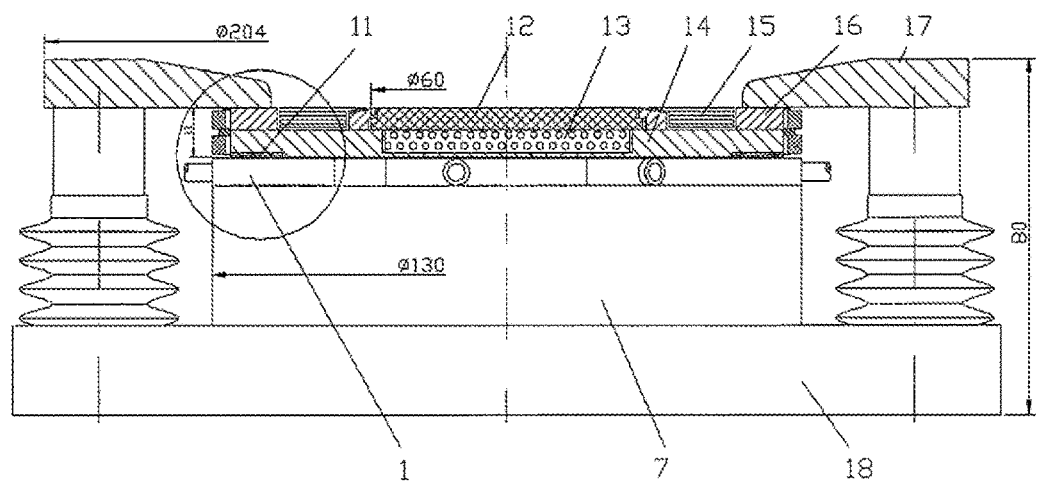
FIG. 4 shows a sectional drawing of a target mount using a component coupling system according to the invention.
Figure 5:
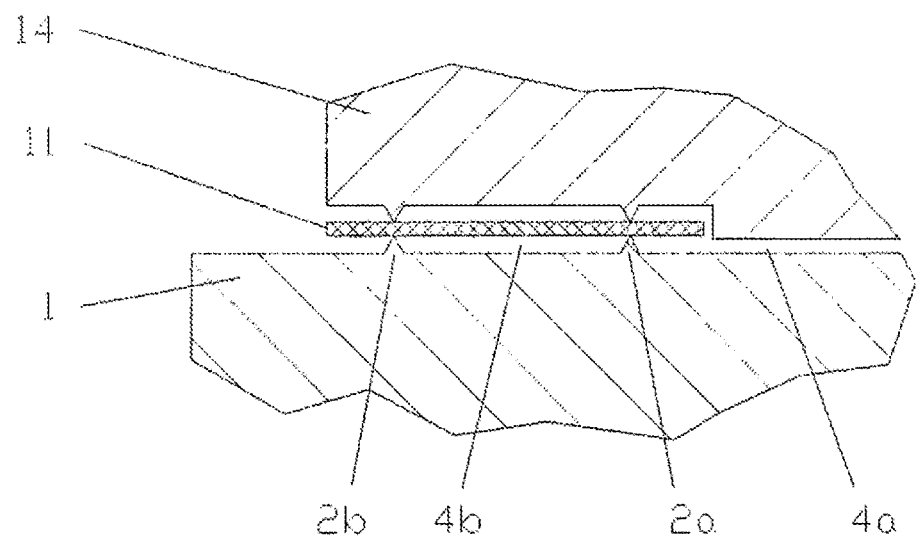
FIG. 5 shows an enlarged detail of the component coupling system according to the invention of FIG. 4.

FIGS. 4 and 5 show sectional drawings of a specific embodiment of the component coupling system according to the invention in a target mount, wherein FIG. 5 shows an enlarged view of the circle represented in FIG. 4.

The sample 12 is fixed in the mount 14 by way of a mask. Adjoining to the outside is a radiation shield 15 for reflecting scattered rays. A heater 13 is disposed directly beneath the sample. The collar 16 forms the counter bearing for the pressing ring 17, which, adjusted by way of a worm and a servo motor, presses the mount comprising the sample against the carrier plate 1 of the component coupling system. On the outer circumference, two contact rings for the heater, including interposed insulation, are shown. The carrier plate 1 is placed onto a water cooler 7. The entire assembly is mounted on a base plate 18. Depending on ambient conditions, such as the required temperature, component rigidity or weight, the mount 14 can be made of different materials and thus represent an entire component according to 3. Due to the present requirements, the use of different materials is necessary and results in separation into components 11, 14.

In the enlarged view (FIG. 5), the use of an additional separate sealing disk 11 is apparent. In this embodiment, both the carrier plate 1 and the mount 14 comprise means for spacing 2a, 2b. Moreover, the sealing disk 11 has openings, which are not shown here. The cavity between the carrier plate and the sealing disk 11 is connected to the cavity between the sealing disk 11 and the mount 14, and can thus be connected only to one further feed or discharge line.

The following table provides an overview as to the effect that the use of a liquid medium, or a vacuum, within the defined cavity of the component coupling system, has on the heat transfer from and to the component (sample).

| Target temperature for the component | External heater | Internal heater | Radiation loss | Component coupling system cavity is | Flow through cooler |
|---|---|---|---|---|---|
| Heating | on | off/on | yes | evacuated | constant |
| Heating | off | on | yes | evacuated | constant |
| Constancy | on | off | yes | filling or throughput (e.g., argon) | constant |
| Constancy | off | on | yes | filling or throughput (e.g., argon) | constant |
| Cooling | on | off | yes | filling or throughput (e.g., He/H$_2$O) | constant or higher |
| Room temperature | on | off | yes | filling or throughput with evaporation (e.g., He/H$_2$O) | high |

The invention claimed is:

1. A component coupling system for controllable heat transfer from or to a component,
comprising
a carrier plate having a side consisting of a planar face;
at least one first means for spacing disposed on the carrier plate, the first means for spacing having a continuous bottommost surface in a first plane and a continuous topmost surface in a second plane parallel to the first plane, the continuous bottommost surface of the first means for spacing being in contact with the planar face of the carrier plate, and a component disposed on the first means for spacing, the component having a side consisting of a planar face, the planar face of the component being in contact with the continuous topmost surface of the first means for spacing, the carrier plate and the first means for spacing thereby being so configured that the first means for spacing together with the carrier plate and the component form a first cavity, the first cavity being within a perimeter created by the first means for spacing; and
a first line for feeding a fluid medium to or discharging the fluid medium from the first cavity; wherein
the carrier plate and the means for spacing each comprise a ceramic or metallic material.

2. The component coupling system according to claim 1, wherein the first means for spacing is a peripheral bead or an O-ring seal.

3. The component coupling system according to claim 1, wherein the first means for spacing has a triangular cross-section with a base of the triangle in contact with the carrier plate and an apex of the triangle in contact with the component.

4. The component coupling system according to claim 1, wherein the carrier plate comprises silicon carbide, a titanium-zirconium-molybdenum material or tungsten.

5. The component coupling system according to claim 1, wherein the first means for spacing comprises silicon carbide, a titanium-zirconium-molybdenum material or tungsten.

6. A component coupling system according to claim 1, further comprising a second means for spacing so configured that the second means for spacing together with the carrier plate and the component form a second cavity within a perimeter of the second means for spacing.

7. The component coupling system according to claim 6, wherein the second means for spacing has a triangular cross-section with a base of the triangle in contact with the carrier plate and an apex of the triangle in contact with the component.

8. The component coupling system according to claim 6, wherein the second cavity is between the respective perimeters of the first and second means for spacing and the component coupling system further comprises a second line for feeding a fluid medium to and discharging the fluid medium from the second cavity.

9. The component coupling system according to claim 1, wherein the first means for spacing has a height of more than 1 mm but less than 10 mm.

10. A method for operating a component coupling system according to claim 1, comprising:
    evacuating a fluid medium from the first cavity via at least the first line; or
    filling the first cavity with a fluid medium via at least the first line; or
    flowing a fluid medium through the first cavity by feeding the fluid into the first cavity via at least one feed line and discharging the fluid from the cavity via the first line.

11. A method for operating a component coupling system according to claim 6, comprising
    evacuating a fluid medium from the first cavity via at least the first line; or
    filling the first cavity with a fluid medium via at least the first line; or
    flowing a fluid medium through the first cavity by feeding the fluid medium into the first cavity via at least one feed line and discharging the fluid medium from the cavity via the first line; and
    evacuating a fluid medium from the second cavity via the second line.

12. The component coupling system according to claim 9, wherein the first means for spacing has a height less than 5 mm.

13. The component coupling system according to claim 6, wherein the first and second means for spacing each has a height of more than 1 mm but less than 10 mm.

14. The component coupling system according to claim 13, wherein the height of each of the first and the second means for spacing is less than 5 mm.

* * * * *